(12) United States Patent
Braun et al.

(10) Patent No.: US 8,570,339 B2
(45) Date of Patent: Oct. 29, 2013

(54) MODIFYING COLOR ADJUSTMENT CHOICES BASED ON IMAGE CHARACTERISTICS IN AN IMAGE EDITING SYSTEM

(75) Inventors: Karen M. Braun, Fairport, NY (US); Elizabeth D. Wayman, Ontario, NY (US); Raja Bala, Pittsford, NY (US); Michael P. Kehoe, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 326 days.

(21) Appl. No.: 13/116,410

(22) Filed: May 26, 2011

(65) Prior Publication Data

US 2012/0299942 A1 Nov. 29, 2012

(51) Int. Cl.
*G09G 5/02* (2006.01)
(52) U.S. Cl.
USPC .......... 345/594; 345/581; 345/589; 345/593; 382/162; 382/167; 382/168; 715/762; 715/763
(58) Field of Classification Search
None
See application file for complete search history.

(56) References Cited

U.S. PATENT DOCUMENTS

| 7,756,341 | B2 | 7/2010 | Perronnin |
| 8,085,276 | B2 * | 12/2011 | Voliter et al. ................. 345/589 |
| 2007/0100786 | A1 | 5/2007 | Moroney |
| 2007/0109569 | A1 | 5/2007 | Eschbach et al. |
| 2007/0133024 | A1 * | 6/2007 | Kang et al. .................... 358/1.9 |
| 2008/0007749 | A1 | 1/2008 | Woolfe |
| 2008/0069456 | A1 | 3/2008 | Perronnin |
| 2008/0143738 | A1 | 6/2008 | Woolfe et al. |
| 2008/0278744 | A1 | 11/2008 | Marchesotti et al. |
| 2009/0073465 | A1 | 3/2009 | Rolleston et al. |
| 2009/0208118 | A1 | 8/2009 | Csurka |
| 2010/0085377 | A1 | 4/2010 | Woolfe |
| 2010/0086230 | A1 | 4/2010 | Bala et al. |
| 2010/0110455 | A1 | 5/2010 | Woolfe |
| 2010/0226564 | A1 | 9/2010 | Marchesotti et al. |
| 2010/0293458 | A1 | 11/2010 | Rolleston et al. |
| 2010/0306645 | A1 | 12/2010 | Roulland et al. |

OTHER PUBLICATIONS

Weijer, et al., "Learning Color Names for Real-World Applications", IEEE Transactions on Image Processing, vol. XX, No. Y, pp. 1-24, Mar. 4, 2009.
Woolfe, Geoff, "Natural Language Color Editing", Proceedings of the Xerox Innovation Group Conf, 2006. Webster, NY.
Phaser 7500 Tabloid-size Color Printer, 2010.

* cited by examiner

*Primary Examiner* — Antonio A Caschera
(74) *Attorney, Agent, or Firm* — Philip E. Blair; Fleit Gibbons Gutman Bongini & Bianco P.L.

(57) ABSTRACT

A system and method for dynamically reducing the number of choices by reordering the selectable menu options in each menu of a color adjustment tool based on image content, selections in other menus, and usage history. Color names and color modifiers are reduced and/or reordered through image analysis, with most frequently occurring colors being placed at the top of the menu and excluding less frequently used or unused colors from the menu. Adjustment adjectives are reduced by eliminating nonsensical or rare color adjustment combinations (e.g. make the grays much more colorful, make the blues yellower), and/or reordered based on usage history, either by the individual user or by aggregating over many users.

14 Claims, 7 Drawing Sheets

MODIFYING COLOR ADJUSTMENT CHOICES BASED ON IMAGE CHARACTERISTICS IN AN IMAGE EDITING SYSTEM

CROSS REFERENCE TO RELATED CASES

This case is related to concurrently filed U.S. patent application Ser. No. 13/116,210, entitled "Method And Apparatus For Editing Color Characteristics Of Electronic Image", to Braun et al.

TECHNICAL FIELD

The present invention is directed to systems and methods which make choosing user selectable color rendering modifications quicker and easier for the inexperienced user based upon color characteristics of an image.

BACKGROUND

Color printing and image processing applications require a user interface that allows the user to communicate color requirements or instructions. The internal description of these requirements is a precise color encoding which is arcane to the uninitiated. Some digital imaging and document editing applications provide powerful and sophisticated tools for experienced users. However, the learning curve for such tools can be steep. Such image editing tools provide a user with the ability to edit colors in a document according to their preference and expectation. Solutions have arisen in this art which provide a natural language interface for image editing tools and document creation software by which users can construct color change modifiers to specify the changes they want to make. Natural language provides many modifying adjectives or phrases to provide further subtle discrimination in color specification that a user desired to make, such as: "Make greens lighter" or "Make blues deeper". Such phrases, when made or selected by the user, are converted into a transform which, in turn, references a 3-dimensional lookup table (LUT) to obtain the desired operation to be performed on the image displayed. Although this system is easier for users than using sophisticated image editing software tools known in the color science arts to edit their respective images, users may find themselves confused and even paralyzed by the choices available for selection. Some choices may not even be relevant or proper for a given image. For example, an image editing menu should not display the selectable modifying phrase "Make yellows lighter" if there is no yellow present in the image. As such, rather than expose a user to all possible selectable color adjective modifiers and phrases, it is desirable to analyze the image being edited and then present the user with choices that are appropriate from which a selection can be made.

Accordingly, what is needed in this art are increasingly sophisticated systems and methods for modifying the menu choices available for selection by a user using the user interface of image editing software based upon a color characteristic of a selected image.

INCORPORATED REFERENCES

The following U.S. Patents, U.S. Patent Applications, and Publications are incorporated herein in their entirety by reference.

"Natural Language Color Communication And System Interface", US Publication No. 20080007749, by Woolfe.

"Natural Language Color Communication And System Interface", US Publication No. 20090073465, by Rolleston et al.

"Color Management System And Method Using Natural Language Description Of Color Differences", US Publication No. 20100293458, by Rolleston et al.

"Constrained Language-Based Color Selection Algorithm", US Publication No. 20100085377, by Woolfe.

"Enabling Color Profiles With Natural-Language-Based Color Editing Information", US Publication No. 20100086230, by Bala et al.

"Language Based Color Selection Method", US Publication No. 20100110455, by Woolfe.

"Framework For Image Thumbnailing Based On Visual Similarity", US Publication No. 20100226564, by Marchesotti et al.

"Guided Natural Language Interface For Print Proofing", US Publication No. 20100306645, by Roulland et al.

"Context Dependent Intelligent Thumbnail Images", US Publication No. 20090208118, by Csurka.

"Print Job Aesthetics Enhancements Detection And Modeling Through Combined User Activity Analysis And Content Matching", U.S. Publication No. 20080278744, by Marchesotti et al.

"A Method And System To Determine Preferred Color Management Settings For Printing Documents", U.S. Publication No. 20080143738, by Woolfe et al.

"Determining The Color Match Between Image Data And Graphics Objects", U.S. Publication No. 20070109569, by Eschbach et al.

"Bags Of Visual Context-Dependent Words For Generic Visual Categorization", US Publication No. 20080069456, by Perronnin.

"Generic Visual Categorization Method And System", U.S. Pat. No. 7,756,341 to Perronnin.

BRIEF SUMMARY

What is disclosed is a novel system and method for modifying a set of color adjustment menu choices based upon identified color characteristics of a user selected image in an image editing system. The teachings hereof utilize image content to dynamically reduce the selectable color editing options in any of a number of different image editing menus of a color adjustment tool of an image editing system such that the user is exposed only to those menu choices that are relevant to the selected image. Selectable choices can be further modified by either the user's usage history or by a usage history aggregated over a plurality of users. Through an implementation hereof, the order that the options are presented on the user interface facilitates an appropriate selection for a particular image.

In one example embodiment, the present method for modifying menu choices available for selection in an image editing system involves performing the following. First, an image to be edited using an image editing system is selected. The image editing system has a user interface comprising, at least in part, a set of pre-defined user selectable color adjustment choices. The user selectable color adjustment choices are, for instance, made available to the user as part of a pull-down menu. The selected image is then analyzed to identify at least one color characteristic of the image such as, for example, color content of the image, or an image attribute such as hue, lightness, contrast, and the like. Analyzing the image involves determining a histogram of colors of the image, determining a saliency metric based on colors in the image, performing a spatial analysis on the image, or classifying the image based on, for example, image content, image type, and the like. Once the image has been analyzed, the set of color adjustment choices made available to the user for selection is dynamically modified based upon the identified color characteristics of the selected image. Modifying the color adjustment choices can have the form of, for example, prioritizing the adjustment choices in the set of choices, adding/removing choices to/from the set of selectable choices, and defining or otherwise providing to the use a new set of color adjustment choices for selection.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
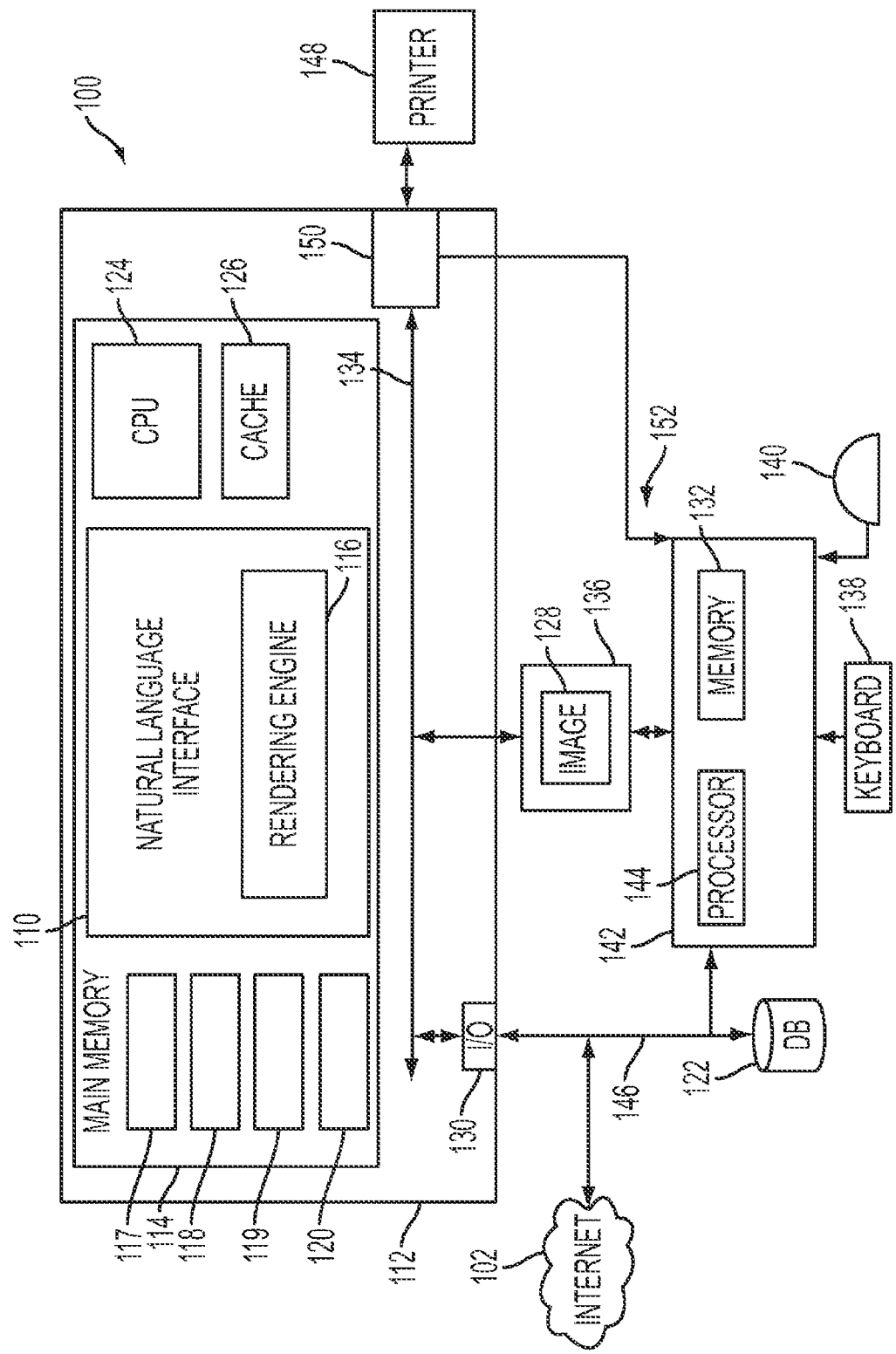
FIG. 1 is a block diagram of one example image editing system incorporating a natural language interface and a natural language rendering image wherein various aspects of the teachings hereof find their intended uses.

What is disclosed is a novel system and method for modifying user selectable menu options based on image color characteristics in an image editing system such that the user is exposed to those menu selections that are relevant to the image being edited. The teachings hereof utilize image content to dynamically reduce the selectable color editing options in any of a number of different image editing menus of a color adjustment tool of an image editing system. Usage history could be used to reorder the selectable options with most frequently occurring selections being placed at the top of the menu and less frequently used being placed at a bottom of the menu. Nonsensical or rarely used options can be excluded from selection altogether.

Non-Limiting Definitions

An "image" refers to a pattern of physical light comprised of known colors of the light spectrum which are visible by the human eye. When reduced to print, the image generally comprises a plurality of colored pixels arrayed on a media substrate or display device. Pixels of an image are arrayed in a generally rectangular grid or points of color values each having an associated location. A bitmap of an image is characterized by the width and height of the image in pixels and by the number of bits-per-pixel (a color depth, which determines the number of colors it can represent). A pixel is to the smallest element into which an image can be divided. Pixels are associated with a color value defined in terms of a color space having at least 3 color coordinates or axes. Pixels of an image are associated with a value, such as, for instance: color, intensity, lightness, brightness, or some mathematical transformation thereof.

"Color names" refers to the names of colors as they are commonly known, such as, for example, red, green, blue, yellow, etc. Color names may comprise a combination of color such as, for example, reddish-brown, greenish-blue, yellowish-green, etc. See: "*Principles of Color Technology*", by Fred W. Billmeyer, Jr. and Max Saltzman, John Wiley & Sons, ISBN 0-471-03052-X (1981).

A "modifier" is an adjective which effectuates a more precise description of a broad set of color manipulation capabilities available the image editing software. Examples modifiers are: "light", "dark", "bright", "greenish", and the like. Such modifiers may further include a magnitude and a direction such as "increase by 10%".

A "color adjustment choice" is a color name, or a modifier, or both, which identifies, when selected by a user, an amount of color discrimination to be applied to an image by an image editing system. Example color adjustment adjective choices are shown and discussed with respect to the display menus of FIGS. 2-5. Modifying color adjustment choices means altering the list of choices available for a user selection for a given menu on the user interface of an image editing system. The modified color adjustment choices are tailored to a particular image and/or to a particular user or set of users. The list of color adjustment choices can be prioritized, added to, deleted from, or substituted for by another list of choices.

A "color characteristic" is a characteristic of an image based on color content of the image and includes hue, lightness, contrast, and the like. Color characteristics can be weighted based on a variety of factors such as, for instance, importance, color, location in the image, and the like.

"Analyzing an image" means examining the image to identify one or more color characteristics. The image can be examined using a variety of techniques such as, for example, a histogram of colors; a saliency metric; a spatial analysis; or a classification of the image, or a combination thereof.

'A "Saliency Metric" is a calculation on a characteristic of the image which reflects the relative importance of the characteristic relative to other characteristics of the image. Saliency metrics include, for example, measurements of size, position, brightness, and color.

"Spatial Analysis" is an image analysis technique which quantizes values of the image, such as spatial frequency content, an average intensity, color characteristics (in the case of color images), gradient values, and/or other characteristics such as, for example, location of certain color pixels in the image, detection of faces or other objects of interest, to name a few, including connectedness.

"Image Classification" is an analysis technique which utilizes a classifier such as the Xerox Generic Visual Classifier (GVC).

An "image editing system" is a hardware and software system which applies a color adjustment choice to an image. Such a system may comprise a standalone computer workstation or a print system device, or a handheld device such as a cellphone or the like. An image editing system has display device such as an LCD display, and a user interface such as a keyboard, keypad, mouse, or touchpad, for enabling a user to make a selection from a list of color adjustment choices displayed on a graphical display device. A user selection of a color adjustment choice effectuates a change in a color of an image. The present method, when employed with such a system, modifies the list of color adjustment adjectives presented to a user in a given menu of the user interface thereof such that naive users can quickly and easily make sophisticated color editing selections from an appropriate subset of choices derived from a larger set of choices based upon one or more color characteristics of a selected image. An image editing system may be integrated, in whole or in part, in a color management system of a document reproduction device whereon a user desires to apply a selected color adjustment choice to an image such that the image is rendered by the print device with the color modifications having been applied thereto.

General Discussion

The above-incorporated reference: "Constrained Language-Based Color Selection Algorithm" discloses a method to specify a color selection that allows users to construct color descriptions for color modification using a user interface for creating and combining color selection descriptions via menus or other suitable display techniques. One example system is shown and discussed with respect to the block diagram of FIG. 1. Using such a system, the user builds sets of color descriptions and then combines these color descriptions using a list box menu and, optionally, a set of check boxes or buttons to indicate whether the described color is to be specifically included or excluded in the eventual selection. The combined color descriptions provide a language-based specification from which color selection can be made and image modification performed. The teachings hereof are intended to enhance these capabilities by modifying the selectable choices presented to the user. The present system dynamically creates selectable menu options tailored to a particular image and/or to a particular user or set of users, from which such color descriptions can be created.

Example Image Editing System

Reference is now being made to FIG. 1 which illustrates a schematic diagram of one example embodiment of an image editing system incorporating an example natural language interface.

System 100 incorporates a user interface 110 which is hosted, in whole or in part, by computer system 112. System 112 can be, for example, a desktop computer, laptop, server, portable digital assistant (PDA), cellphone or cellular device, and the like, which have been adapted to perform the methods described herein. User interface 110 may be hosted by a server accessed by the user via a web portal. Computer 112 includes memory 114 which, in part, stores a natural language rendering engine 116. Also resident in memory 114 are various program modules each containing machine readable program instructions for analyzing the image to identify color characteristics thereof. For instance, program module 117 has pre-loaded program software which analyzes the image and determines a histogram of colors and uses the histogram to identify the color characteristics of the image. The color characteristics of the image are used to modify the set of color adjustment choices present to the user on the user interface. Program module 118 is also in memory and contains software programs which determine one or more relevance metrics for an image which, in turn, are used to modify the set of color adjustment choices. Resident program 119 performs a spatial analysis of the image and program 120 performs a classification of the image. Data values, algorithms, mathematical functions, and the like, required by any of the program modules may be stored and/or retrieved from storage device 122. Machine readable program instructions of the various modules are executed by processor 124 utilizing cache 126. Rendering engine 116 includes various software components executable by processor 124 whose function is best understood with reference to the methods described below. Digital document image 128 may be input to the computer 112 via an I/O port 130 and temporarily stored in data memory 132. All of the various components of system 100 are in communication with each other via data/control bus 134. Memory 114, 126, and 132 may comprise any type of computer readable medium such as random access memory (RAM), read only memory (ROM), magnetic disk or tape, optical disk, flash memory, or holographic memory. In one embodiment, the memory 132 comprises a combination of random access memory and read only memory.

Natural language interface 110 communicates with the user via a graphical user interface (GUI) which may include a visual display 136, such as an LCD screen or monitor, and a user input device 138 such as an alphanumeric keyboard, keypad, touch screen, cursor control device, or combination thereof, and mouse 140. It should be appreciated that the graphical display and the user input devices may be linked to the computer 112 hosting the interface 110. Interface 110 causes the GUI to display image 128, or a user-selected portion thereof. The GUI may send the image to printer 148. Interface 110 may receive input from printer 148 via a print mediator 150. Interface 110 is configured for communicating information gained through an interaction with the user via an input/output device 150 communicatively linked to image editing system 152. Rendering engine 116 is configured for receiving input from a user concerning color characteristics of displayed image 128 and initiating an execution of the appropriate program module 117-120. Interface 110 guides the user through a series of selections and refinements that allow the user to manipulate the displayed image. Workstation 142 incorporates a central processing unit 144 and memory 132 for facilitating the modification of displayed menu selections. The workstation is in communication with one or more remote devices over internet 102 and linked thereto by communication link 146.

Example Displayed Menu Selections

Rather than give the user all possible menu choices, it is desirable to provide the user with choices that are particularly relevant to the image displayed. Top choices could be given at the top of the list as recommended choices. Alternately the relevant choices might be the only ones on the list, or the less relevant choices might be grayed out, or the choices might all be reordered to give the most relevant at the top of the list. In this last case, it would be desirable to show the percent of relevance next to the adjective so that the user isn't confused that the menu list keeps changing. Next will be discussed an example Natural Language Interface used to create color descriptions for an image.

Figure 2:
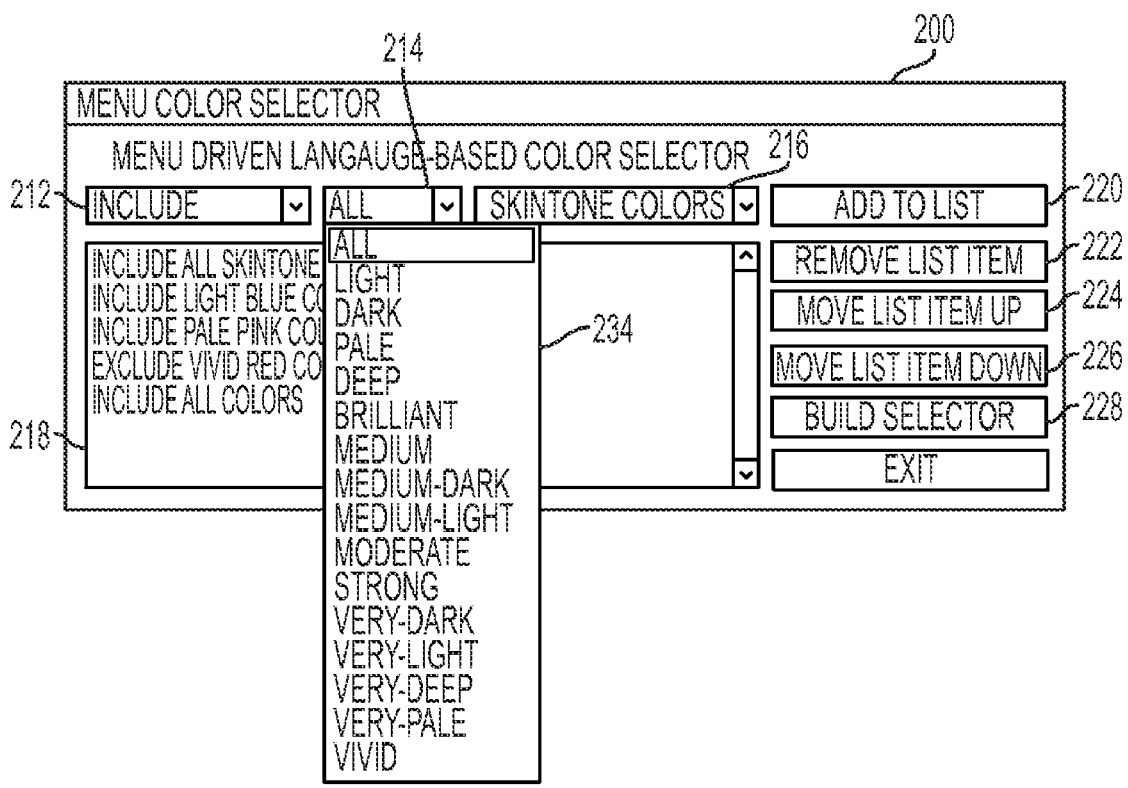
FIGS. 2-4 show an example selectable set of color adjustment choices used by a user to create a color description which collectively define a color selection specification for an image.
Figure 3:
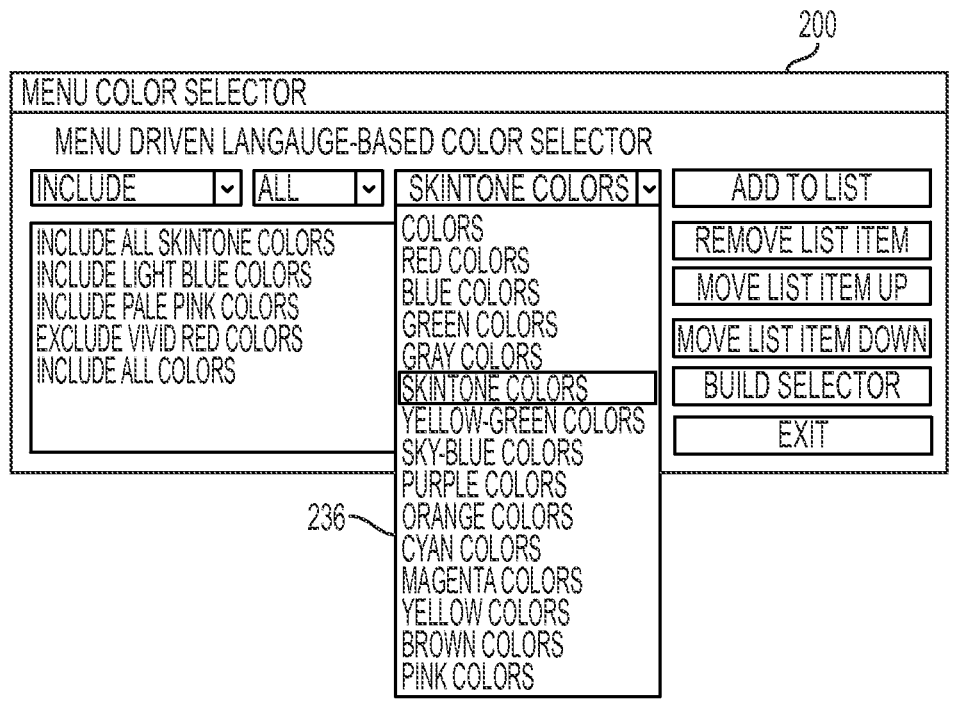

FIG. 2 shows a typical screen display of an example user interface that provides a set of menus that allow a user to create and combine sets of language-based descriptions of colors that are to be included in the selection. Various aspects of the present method are directed towards modifying the user selectable menu options in such an example interface. In this embodiment, screen display 200 consists of three popup menus 212, 214, and 216 which allow the creation of color descriptions to be included or excluded in the selection. Color descriptions are added to list 218 and various controls are provided via selectable pull down menus show as, for example, Add to List 220, Remove List Item 222, Move List Item Up 224, Move List Item Down 226 and a button Build Selector 228 to combine selected color descriptions from the list box 218. Popup menus 212, 214, and 216 allow the user to construct phrases that describe colors and whether the colors should be included or excluded in the color selection. The Remove List Item 22, Move List Item Up 24 and Move List Item Down 26 are provided to manipulate the color descriptions in the listbox.

A first, leftmost, popup menu 212 allows the user to specify whether the color will be included or excluded from the selection. In this example, two choices are provided for a user selection, include or exclude. The reason for providing an "exclude" option is to allow the creation of complex selections such as "include all colors, exclude green colors", where the excluded region overrides the selection of all green colors. This will become apparent in the explanation of combining color descriptions below. Second popup menu 214 provides a choice of color modifiers 234 which allow for more precise description of broad color categories. In this example the entries in this menu include "all", "light", "dark", "pale", "deep", "brilliant", "medium", "medium-dark", "medium-light", "moderate", "strong", "very-dark", "very-light", "very-deep", "very-pale" and "vivid". Third popup menu 216 provides a choice of basic useful color names 236 of FIG. 3 which more particularly shows the color description "include all skintone colors" 38 being created. These generally include at least basic color names as well as the names of important colors such as sky and skin. In this example the entries in this menu include "colors", "red colors", "blue colors", "green colors", "gray colors", "skintone colors", "yellow-green colors", "sky-blue colors", "purple colors", "orange colors", "cyan colors", "magenta colors", "yellow colors", "brown colors" and "pink colors". Once a color description has been created it can be added to the listbox by pressing the Add to List button 220. The color description then appears in the listbox 218. It can be seen from FIG. 3 that many color descriptions can be created and added to the listbox. Having populated the listbox with a number of appropriate color descriptions, the user can define a complex language-based color specification description by selecting one or more of the color descriptions in the listbox.

Figure 4:
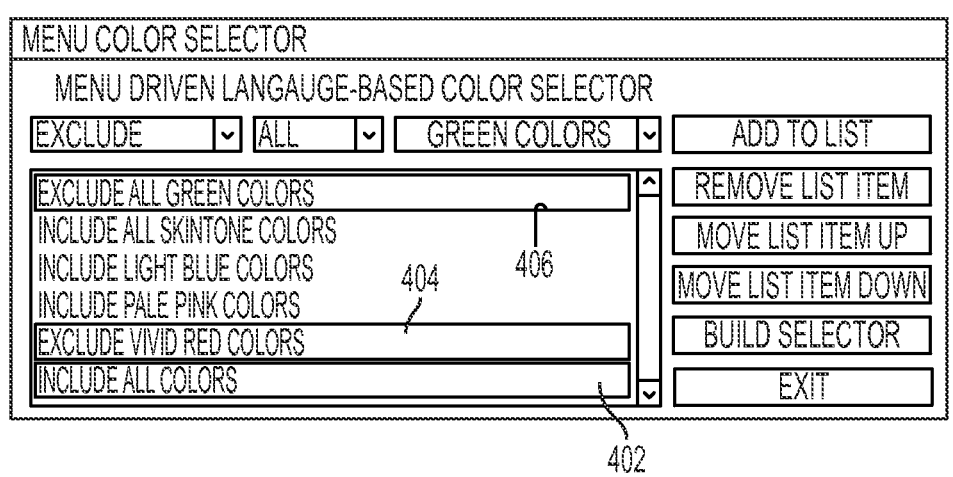

In FIG. 4, the user has chosen three of the color descriptions from the listbox: include all colors 402; exclude vivid red colors 404; and exclude all green colors 406. These choices together define a color selection specification that will select all colors except green colors and vivid red colors.

Flow Diagram of One Example Embodiment

Figure 6:
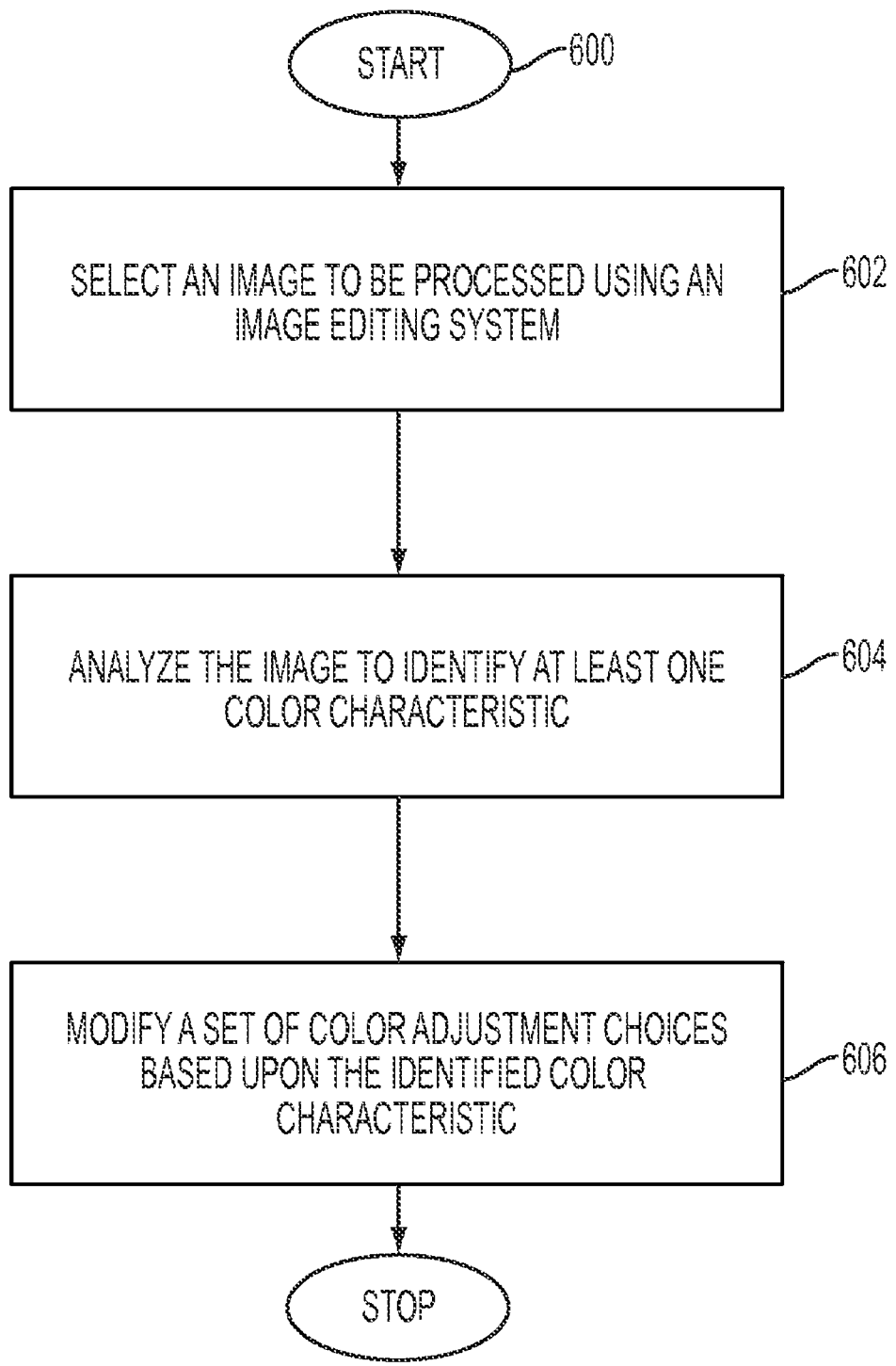
FIG. 6 is a flow diagram of one example embodiment of the present method for modifying user selectable menu options in an image editing system.

Reference is now being made to the flow diagram of FIG. 6 which illustrates one example embodiment of the present method for modifying user selectable menu options in an image editing system such that the user is only exposed to those menu selections that are relevant to the image being edited. Flow processing begins at step 600 and immediately proceeds to step 602.

Figure 5:
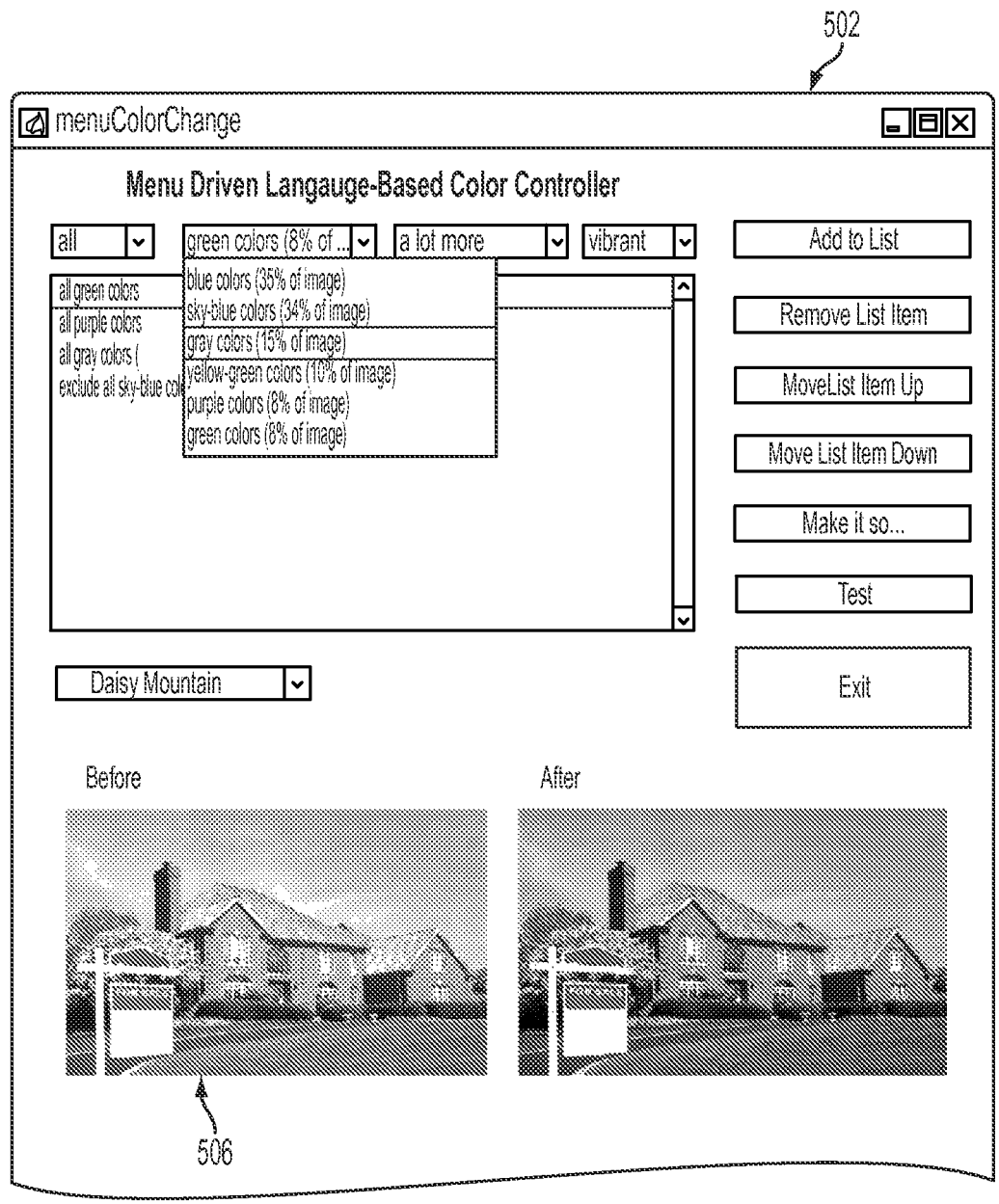
FIG. 5 shows an actual implementation of the menus of FIGS. 2-4.

At step 602, an image to be edited using an image editing system is selected for processing. The image editing system has a user interface comprising, at least in part, a selectable set of color adjustment choices. FIG. 5 shows an actual implementation of menu 502 having a selectable set of color adjustment choices for image 506.

At step 604, the image is analyzed to identify at least one color characteristic thereof. There are several techniques that could be used to expose and order the color words in these menus. One such method classifies color pixels in the image into their respective color names, and then creates a histogram of color names. The histogram is then analyzed and more frequently occurring color names in the histogram are used as a basis to modify the color adjustment choices. In one case, only color names occurring with a frequency greater than a certain threshold are shown to the user. An example would be to show the user all colors that occur in more than 10% of image pixels. In another case, only a fixed number of the most frequent color names are shown. An example would be to show the user the top ten most frequent colors. Optionally, the percentages can be shown to the user in the menus.

Another class of techniques employs spatial analysis to determine color characteristics of the image. One example would be to look for connectedness among all pixels of a given color name, and to show to the user only those color names that are associated with connected regions of a certain minimum size in the image. Morphological filtering could be used to determine connectedness, for example.

Another class of techniques calculates saliency or relative importance as a function of image location, and only shows to the user those color names associated with highly salient regions. Determining saliency includes the computation of various metrics such as size, location in the image, brightness, color, texture, etc.

In yet another class of techniques, the image is classified into one of certain predetermined categories using a machine learning or classifier system. Examples of image classes include indoor, outdoor, beach, nature, building, portrait, animals, water, and the like. In such an approach the classifier is first trained in an offline process with labeled image data from known classes. In the application phase, the classifier is then used to assign class labels to arbitrary images. A statistical classifier will generally calculate a probability that a given pixel belongs to each of the classes, and then assign the most probable class to the pixel.

In yet another class of techniques, an automatic image enhancement algorithm can be applied to the image, and the parameters of the enhancement used to determine the most probable changes that the user would want to make and the menu selections adjusted accordingly. For example, if the automatic enhancement makes the image much lighter, then the color adjustment choice "lighter" can be moved towards the top of the selectable menu list. "Darker" might be removed from the list altogether, or moved to the bottom, or grayed out.

At step 606, the set of color adjustment choices are modified based upon the identified color characteristic. Modifying the set of color adjustment choices can take a variety of forms such as, for example, prioritizing color adjustment adjective choices in the set of choices. Color adjective choices having a higher priority can be moved to a top of the list, such as moving the menu item "lighter" to the top of the list if the image is too dark, and giving the option "darker" a lesser priority such that it is moved to the bottom of the list. Modifying the set of color adjustment choices also includes adding/deleting choices from the menu. For example, the option "darker" can be removed from the menu list (grayed out). Options like "Greener" or "Make More Green" can be added to the list if it was determined from an analysis of the image that the image contained a large green area such as for example, a picture of a house with a large area of green grass in the picture. In this instance, an additional choice is added to the set of color adjustment choices available for selection by a user. In other instances, an entirely new set of color adjustment choices is presented to the user which has been pre-defined and tailored for modifying a particular type of image. For example, for an image of a body of water having a large blue or blue/green area, a pre-defined set of color adjustment adjective choices can be presented to the user which have been designed for manipulating images of oceans, or large bodies of water such as lakes, or ponds. Such selectable options may be of great value to the user. Other methods of modifying the set of menu choices presented to the user in accordance with the teachings hereof are intended to fall within the scope of the appended claims. These include, for instance, prioritizing the set of menu choices based upon a usage history of the various color adjustment choices which that particular user has used for a pre-determined amount of time or number of sessions. For instance, if the user has a history of "lightening" images then options which involve enhancing an image in this regard can be presented to the user. Such a usage history can be based upon a usage history of the user, or an aggregate of usage by a plurality of users. Usage information can be readily tracked and checked at the start of each image editing session after the user logs into the system or otherwise provides some form of identification such as, for instance, a user-id or group-id. The system then retrieves the historical usage data pertinent to that id and modifies the set of color adjustment adjective choices based upon the retrieved historical data. New information can be added to the historical usage data at the end of a user's image editing session or updated periodically throughout the session.

Once the set of color adjustment adjective choices has been modified in accordance herewith, further processing in this embodiment ends.

Example Image Processing System

Figure 7:
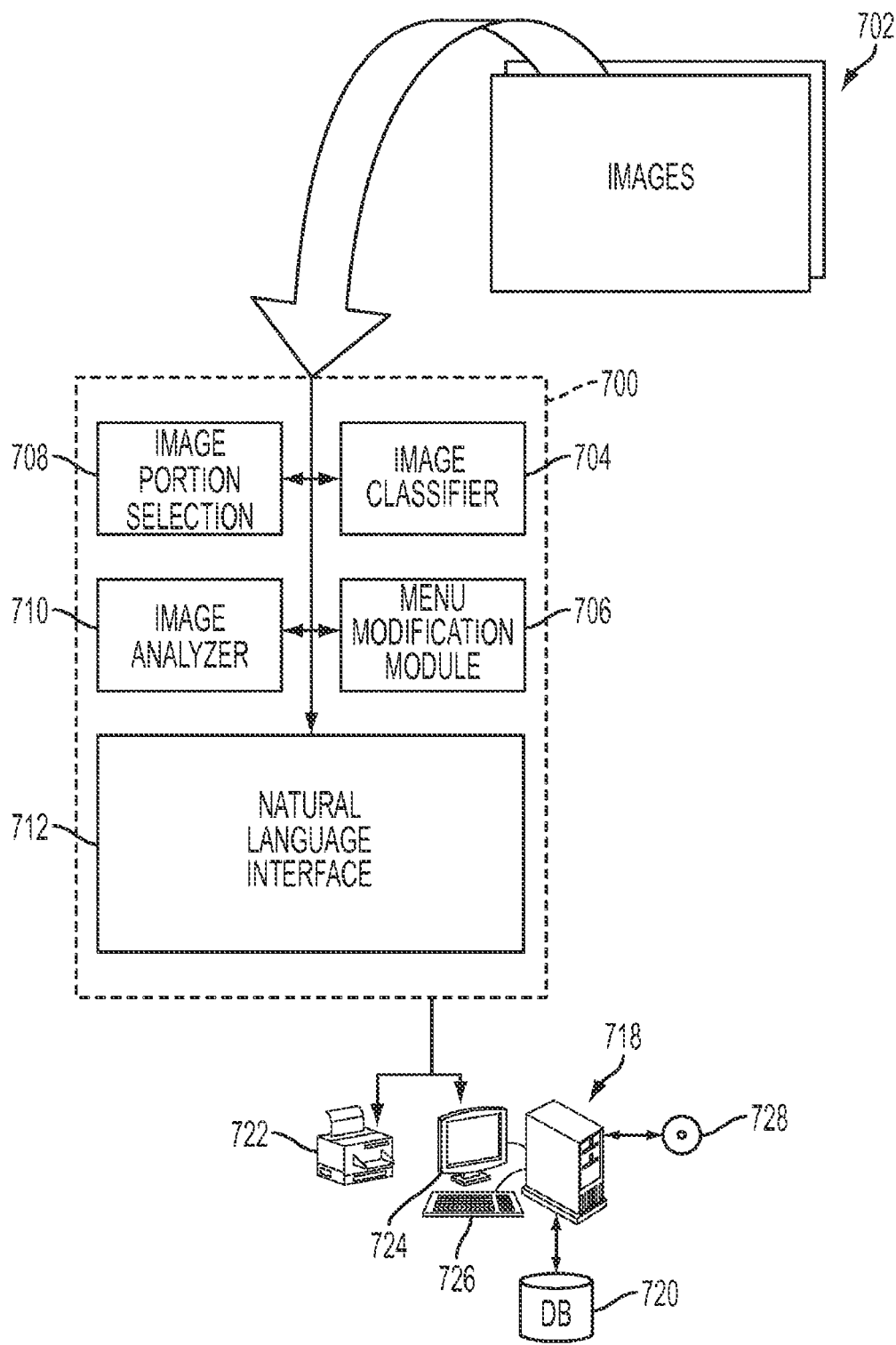
FIG. 7 which illustrates one example image processing system 700 for implementing various aspects of the present method according to the flow diagram of FIG. 6.

Reference is now being made to FIG. 7 which illustrates one example image processing system 700 for implementing various aspects of the present method according to the flow diagram of FIG. 6. Some or all of the block diagram of FIG. 1 can be incorporated, in whole or in part, within the computer workstation of FIG. 7.

In FIG. 7, one or more images 702 are received into image processing system 700. Alternatively, image(s) to be processed are retrieved from database 720 by image editing workstation 718. Regions of the image may be identified or otherwise selected for processing by a user input using, for example, the user interface 724 and 726 of a computer workstation 718. Various color characteristics of the received image may reside in memory or on a storage device associated with computer 718 and retrieved therefrom for selection. Color characteristics about the image such as an image's classification may reside in one or more records stored in database 720 or retrieved from a remote device over a network (not shown). Images may be retrieved from computer readable media 728 or stored thereon upon a completion of an image editing session by the user.

Image portion selection module 708 selects a portion of the image for processing for color characteristics. The selection process effectuates processing of the image by partitioning the image into sections. Sectioning of the image may be effectuated based upon, for example, a classification of the image provided by Image Classifier Module 704. Module 708 may receive an identification of one or more areas of the image selected for processing by the user using the graphical user interface of workstation 718. Module 708 sends the image portions to Image Analyzer 710 which analyzes the image by, for example, processing the received image portions to obtain a histogram of colors contained in the image. Analyzer 710 may perform any of the analysis methods described herein on some or all of the received image. Interim values and data points used for image analysis may be communicated to workstation 718 and displayed on display device 724 for the user's review and input. Menu Modification Module 706 receives information about the analyzed image from module 710 and modifies the menu selections in accordance with any of the above-described embodiments. The modified menu selections are provided, in this embodiment, to Natural Language Interface 712 which performs as described above with respect to the embodiment of FIG. 1. Module 712 is intended to represent some or all of the structure and functionality described with respect to the embodiment of FIG. 1. The modified menu options are displayed for the user. Example displayed menus are shown with respect to the menus of FIGS. 2-5.

The image processing system 700 is capable of executing various aspects of the present method. The image processing system is shown in communication with computer system 718. Some or all of the processing performed by any of the modules of system 700 may be performed by workstation 718 and values and variables used in such processing stored in database 720 or provided to image output device 722 or displayed on display device 724. In various embodiments, the user enters information using keyboard 726. The image or any modifications done thereto may be off-loaded to storage medium 728 for transport. Any of the modules shown herein may reside in computer system 718. Image processing system 700 may further carry out processing on the basis of commands received from computer 718 or which have been received over a communication network (not shown). Various specialized image processing applications may additionally be performed to facilitate or effectuate any of the processing performed by the image processing system 700. The image processing system may be provided as a general structure having an external memory, or as a special purpose computer as discussed herein further.

It should be appreciated that various modules of the block diagram of FIG. 7 designate a system component which may comprise software and/or hardware designed to perform a specific function. A plurality of modules may collectively perform a single function. A module may have specialized processor capable of reading machine executable program instructions. A module may comprise a single piece of hardware such as an ASIC, electronic circuit, or special purpose computer. The functionality of a plurality of modules may be executed by either a single special purpose computer system or a plurality of special purpose computer systems operating in parallel. Connections between modules includes both physical and logical connections. Modules may further include one or more software/hardware modules which may further comprise an operating system, drivers, device controllers, and other apparatuses some or all of which may be connected via a network. System 700 may be connected to a server via a network such as a LAN, a WAN, or the like.

Example Special Purpose Computer System

Any of the features or functions of the above-described embodiments may comprise, in whole or in part, a special purpose computer which includes a processor capable of executing machine readable program instructions for carrying out one or more aspects of the present method. Such a special purpose computer may comprise, for example, a micro-processor, micro-controller, device driver, an electronic circuit, or an ASIC designed to perform some or all of the methods hereof. Such a special purpose computer can be integrated, in whole or in part, with for example, a xerographic system. All or portions of the diagrams of the present system and method, as illustrated herein, may be implemented partially or fully in hardware in conjunction with machine executable instructions in communication with various components of such a system. The exact nature of the implementation will depend on the image processing environment wherein the present method finds its uses. Such a system can be integrated, in whole or in part, with any of a number of computing devices including those in a networked environment. All or portions of the flow diagram of FIG. 6 and the schematic block diagram of FIG. 7 may be implemented partially or fully in hardware in conjunction with machine executable instructions in communication with various components of such a system.

Figure 8:
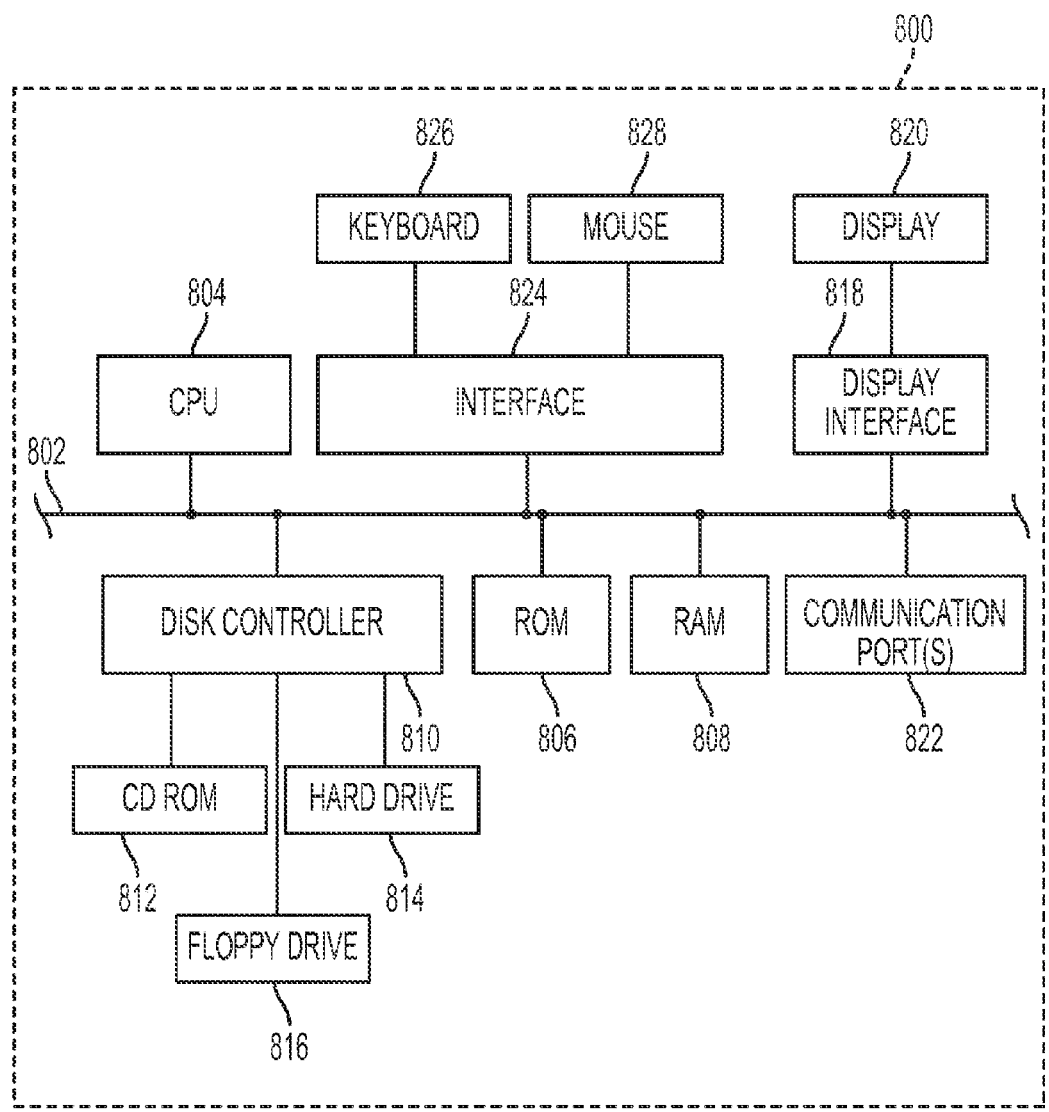
FIG. 8 which illustrates a block diagram of one example embodiment of a special purpose computer system for performing one or more aspects of the present system and method as described with respect to the example flow diagram of FIG. 6 and the block diagram of FIG. 7.

Reference is now being made to FIG. 8 which illustrates a block diagram of one example embodiment of a special purpose computer system for performing one or more aspects of the present system and method as described with respect to the example flow diagram of FIG. 6 and the block diagram of FIG. 7.

The special purpose computer 800 incorporates a central processing unit (CPU) 804 capable of executing machine readable program instructions for performing any of the calculations, comparisons, logical operations, and other program instructions for performing the methods described above with respect to the flow diagrams and block diagrams hereof. The CPU is in communication, using communication bus 802, with Read Only Memory (ROM) 806 and Random Access Memory (RAM) 808 which, collectively, constitute example memory storage devices. Such memory may be used to store machine readable program instructions and other program data and results to sufficient to carry out any of the functionality described herein. Disk controller 810 interfaces with one or more storage devices 814. These storage devices may comprise external memory, zip drives, flash memory, USB drives, memory sticks, or other storage devices with removable media such as CD-ROM drive 812 and floppy drive 816. Machine executable program instructions execute the methods hereof or perform any of the functionality show with respect to the above-described embodiments. Computer readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs (also called computer control logic) may be stored in a main memory and/or a secondary memory. Computer programs may also be received via the communications interface. The computer readable medium is further capable of storing data, machine instructions, message packets, or other machine readable information, and may include non-volatile memory. Such computer programs, when executed, enable the computer system to perform one or more aspects of the methods provided herein. Display interface 818 effectuates the display of information on display device 820 in various formats such as, for instance, audio, graphic, text, and the like. Interface 824 effectuates a communication via keyboard 826 and mouse 828. Such a graphical user interface is useful for a user to review any of the identified objects and for entering information in accordance with various embodiments hereof. Communication with external devices may occur using example communication port(s) 822. Such ports may be placed in communication with any of the example networks shown and described herein, such as the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via any of the communication ports are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts. The teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for modifying editing choices available for selection in an image editing system, the method comprising:
    selecting an image to be edited using an image editing system having a user interface comprising, at least in part, a set of color adjustment choices each identifying an amount of color discrimination that can be applied to an image during rendering;
    analyzing said image to identify color characteristics thereof;

modifying said set of color adjustment choices based upon said identified color characteristics, each of said color adjustment choices being described by a natural language phrase;

prioritizing an order of said modified set of color adjustment choice based upon a relevancy to said selected image; and displaying, for said user, said prioritized color adjustment choices via a selectable menu.

2. The method of claim 1, wherein analyzing said image to identify said at least one color characteristic from said image comprises calculating any of:

a histogram of colors of said image;
a saliency metric based on colors in said image;
a spatial analysis on said image;
a classification of said image; and
parameters from an automatic image enhancement algorithm.

3. The method of claim 1, wherein modifying said set of color adjustment choices further comprises any of:

adding at least one new choice to said set of choices;
deleting at least one choice from said set of choices; and
defining a new set of color adjustment choices.

4. The method of claim 1, further comprising modifying color adjustment choices based upon a usage history of said color adjustment choice selections.

5. The method of claim 4, wherein said usage history is based upon any of:

a usage history of said user; and
an aggregate of usage by a plurality of users.

6. A system for modifying editing choices available for selection in an image editing system, the system comprising:

a memory and a storage medium; and
a processor in communication with said storage medium and said memory, said processor executing machine readable instructions for performing the method of:

selecting an image to be edited using an image editing system having a user interface comprising, at least in part, a set of color adjustment choices each identifying an amount of color discrimination that can be applied to an image during rendering;

analyzing said image to identify color characteristics thereof;

modifying said set of color adjustment choices based upon said identified color characteristics, each of said color adjustment choices being described by a natural language phrase;

prioritizing an order of said modified set of color adjustment choice based upon a relevancy to said selected image; and displaying, for said user, said prioritized color adjustment choices via a selectable menu.

7. The system of claim 6, wherein analyzing said image to identify said at least one color characteristic from said image comprises calculating any of:

a histogram of colors of said image;
a saliency metric based on colors in said image;
a spatial analysis on said image;
a classification of said image; and
parameters from an automatic image enhancement algorithm.

8. The system of claim 6, wherein modifying said set of color adjustment choices further comprises any of:

adding at least one new choice to said set of choices;
deleting at least one choice from said set of choices; and
defining a new set of color adjustment choices.

9. The system of claim 6, further comprising modifying color adjustment choices based upon a usage history of said color adjustment choice selection.

10. The system of claim 9, wherein said usage history is based upon any of:

a usage history of said user; and
an aggregate of usage by a plurality of users.

11. A computer implemented method for modifying editing choices available for selection in an image editing system, the method comprising:

selecting an image to be edited using an image editing system having a user interface comprising, at least in part, a set of color adjustment choices each identifying an amount of color discrimination that can be applied to an image during rendering;

analyzing said image to identify color characteristics thereof;

modifying said set of color adjustment choices based upon said identified color characteristics and a usage history of said color adjustment choice selection, each of said color adjustment choices being described by a natural language phrase;

prioritizing an order of said modified set of color adjustment choice based upon a relevancy to said selected image; and displaying, for said user, said prioritized color adjustment choices via a selectable menu.

12. The computer implemented method of claim 11, wherein analyzing said image to identify said at least one color characteristic from said image comprises calculating any of:

a histogram of colors of said image;
a saliency metric based on colors in said image;
a spatial analysis on said image;
a classification of said image; and
parameters from an automatic image enhancement algorithm.

13. The computer implemented method of claim 11, wherein modifying said set of color adjustment choices further comprises any of:

adding at least one new choice to said set of choices;
deleting at least one choice from said set of choices; and
defining a new set of color adjustment choices.

14. The computer implemented method of claim 11, wherein said image history is based upon any of:

a usage history of said user; and
an aggregate of usage by a plurality of users.

* * * * *